(12) United States Patent
James et al.

(10) Patent No.: US 11,412,736 B2
(45) Date of Patent: Aug. 16, 2022

(54) METHOD OF CONTROLLING WEEDS IN WARM SEASON TURFGRASS

(71) Applicant: SYNGENTA PARTICIPATIONS AG, Basel (CH)

(72) Inventors: John Robert James, Greensboro, NC (US); Lukas Dant, Greensboro, NC (US)

(73) Assignee: SYNGENTA PARTICIPATIONS AG, Basel (CH)

( * ) Notice: Subject to any disclaimer, the term of this patent is extended or adjusted under 35 U.S.C. 154(b) by 255 days.

(21) Appl. No.: 16/480,060

(22) PCT Filed: Jan. 23, 2018

(86) PCT No.: PCT/EP2018/051588
§ 371 (c)(1),
(2) Date: Jul. 23, 2019

(87) PCT Pub. No.: WO2018/134439
PCT Pub. Date: Jul. 26, 2018

(65) Prior Publication Data
US 2019/0364898 A1    Dec. 5, 2019

Related U.S. Application Data

(60) Provisional application No. 62/449,246, filed on Jan. 23, 2017.

(51) Int. Cl.
*A01N 43/42* (2006.01)
*A01N 43/90* (2006.01)

(52) U.S. Cl.
CPC ............. *A01N 43/90* (2013.01); *A01N 43/42* (2013.01)

(58) Field of Classification Search
None
See application file for complete search history.

(56) References Cited

U.S. PATENT DOCUMENTS

| | | |
|---|---|---|
| 2010/0120618 A1 | 5/2010 | Kotzian et al. |
| 2010/0184596 A1 | 7/2010 | Couillard et al. |
| 2011/0269626 A1 | 11/2011 | James et al. |
| 2013/0324401 A1 | 12/2013 | Spesard et al. |
| 2021/0195901 A1 | 7/2021 | Schneider |

FOREIGN PATENT DOCUMENTS

| | | |
|---|---|---|
| JP | 2009524597 A | 7/2009 |
| JP | 2010523509 A | 7/2010 |
| JP | 2012504567 A | 2/2012 |
| JP | 2015519364 A | 7/2015 |
| WO | 2010/040485 A1 | 4/2010 |
| WO | 2013/110553 A1 | 8/2013 |
| WO | 2013/181090 A2 | 12/2013 |

OTHER PUBLICATIONS

Torpedo grass Sep. 19, 13, Bahiagrass May 22, 2007, Carpet grass Jul. 29, 2017 and Signalgrass 2014 (Year: 2013).*
Bahiagrass May 22, 2007 (Year: 2007).*
Carpet grass Jul. 29, 2017 (Year: 2017).*
Signalgrass 2014 (Year: 2014).*
International Search Report for International application PCT/EP2018/051588 dated Mar. 20, 2018.
Elmore et al: "Herbicide safeners Increse Creeping Bentgrass (Agrostis stolonifera) Tolerance to Pinoxaden and Attest Weed Control", Weed Technology, vol. 30, 2016, pp. 919-928 (XP002778888).

* cited by examiner

*Primary Examiner* — Alton N Pryor
(74) *Attorney, Agent, or Firm* — BakerHostetler; Toni-Junell Herbert

(57) ABSTRACT

The present invention relates to a method for controlling dallisgrass or tropical signalgrass in warm-season turfgrass, comprising applying to the warm-season turfgrass to the locus of the warm-season turfgrass an effective rate of pinoxaden.

20 Claims, No Drawings

METHOD OF CONTROLLING WEEDS IN WARM SEASON TURFGRASS

CROSS-REFERENCE TO RELATED APPLICATIONS

This application is a 371 National Stage application of International Application No. PCT/EP2018/051588, filed Jan. 23, 2018, which claims priority to U.S. 62/449,246 filed Jan. 23, 2017, the entire contents of which applications are hereby incorporated by reference.

FIELD OF TECHNOLOGY

The present invention relates to methods of selectively controlling undesirable vegetation components in warm season turf grass. More specifically, the present invention relates to methods of controlling weeds in warm season turfgrass with pinoxaden or a herbicidal composition comprising pinoxaden.

BACKGROUND

The protection of crops from weeds and other vegetation that inhibit crop growth is a constantly recurring problem in agriculture and turf management. In addition, aesthetically, it may be of interest to remove such unwanted weeds and vegetation, for example, when growing turf in areas such as golf courses, sod farms, lawns and public parks. To help combat these problems, researchers in the field of synthetic chemistry have produced an extensive variety of chemicals and chemical formulations effective in the control of such unwanted growth. Chemical herbicides of many types have been disclosed in the literature and a large number are in commercial use. Commercial herbicides and some that are still in development are described in 'The Pesticide Manual', $13^{th}$ Edition, published 2003 by the British Crop Protection Council.

SUMMARY

By way of summary, the present invention includes methods of selectively controlling undesirable vegetation components such as commercially important weeds in warm season turfgrass by applying to the warm-season turfgrass or to the locus of the warm season turfgrass a herbicidally effective rate of pinoxaden or a herbicidal composition comprising pinoxaden.

The above summary is intended to summarize certain embodiments of the present disclosure. Systems, methods and compositions will be set forth in more detail, along with examples demonstrating efficacy, in the figures and detailed description below. It will be apparent, however, that the detailed description is not intended to limit the present invention, the scope of which should be properly determined by the appended claims.

DETAILED DESCRIPTION

As indicated above, the present invention includes methods of selectively controlling certain weeds selected from tropical signalgrass, tropical carpetgrass, large crabgrass, bahiagrass, torpedograss, bull *paspalum* and thin *paspalum* and dallisgrass in warm season turfgrass by applying to the warm season turfgrass or to the locus of the warm season turfgrass a herbicidally effective rate of pinoxaden or a herbicidal composition thereof.

Pinoxaden (IUPAC: 8-(2,6-Diethyl-4-methylphenyl)-7-oxo-1,2,4,5-tetrahydro-7H-pyrazolo[1,2-d][1,4,5]oxadiazepin-9-yl-2,2-dimethylpropanoat) is a phenylpyrazole herbicide. Pinoxaden inhibits the synthesis of membrane lipids, resulting in desiccation of the target. According to the invention, by "turfgrass" there is understood an annual or perennial Gramineae. Said gramineae preferably belongs to one or more of the genera *Agropyron, Agrostis, Axonopus, Bromus, Buchloë, Cynodon, Eremochloa, Festuca, Lolium, Paspalum, Pennisetum, Phleum, Poa, Stenotaphrum* or *Zoysia*. In some embodiments, said gramineae belongs to one or more of the genera *Agrostis, Buchloë, Cynodon, Eremochloa, Festuca, Lolium, Paspalum, Pennisetum, Poa, Stenotaphrum* or *Zoysia*.

The methods of the present invention may be useful, in some embodiments, on warm season turfgrasses. Some warm season turfgrasses that may be useful in the present invention include, but are not limited to, Bermudagrasses (*Cynodon* L. C. Rich), Zoysiagrasses (*Zoysia* Willd.), St. Augustinegrass (*Stenotaphrum secundatum* (Walt.) Kuntze), Centipedegrass (*Eremochloa ophiuroides* (Munro.) Hack.), Buffalograss (*Buchloe dactyloides* (Nutt.) Engelm.)

According to the invention, the "locus" of a turf can relate to soil or to a substrate. An example for such a locus is a golf course, on which turfgrass is managed. According to the present invention the term "soil" means natural soil, which is typically present on a land area, such as soil being present on a golf course, or means soil, that has been modified, such as soil being granulated and/or treated with agrochemicals, such as for example fertilizers. An example of granulated and/or treated soil is disclosed in U.S. Pat. No. 5,265,372.

According to the invention, the term "substrate" means a medium for the growth of turfgrass and the like, suited for application to a variety of existing ground structures. Typically, such mediums are soil-free mixtures that include sufficient proportions of ingredients of elastomeric granules, suitable binding emulsion, mineral aggregate, filler and controlled release plant nutrient particles, so that when laid and cured, said mixture produces a water permeable, resilient substrate having air pockets through which a root system of turfgrass can penetrate. Turfgrass growing on said substrate can form a turf, which can be applied to non-porous surfaces, such as for example roofs of buildings, terraces and other hard surface areas, or to porous surfaces, such as for example football fields or golf courses. Examples of such substrates are described in WO 2005/002323. Elastomeric granules can be, for example, granules of rubber, granules of recycled vehicle tyre rubber or mixtures thereof.

The methods of the present invention include the application of a herbicidally effective amount of pinoxaden. The term "herbicide" as used herein denotes a compound which controls or modifies the growth of plants. The term "herbicidally effective amount" indicates the quantity of such a compound or combination of such compounds which is capable of controlling or modifying effect on the growth of plants. Controlling or modifying effects include all deviation from natural development, for example: killing, retardation, leaf burn, albinism, dwarfing and the like. For example, plants that are not killed are often stunted and non-competitive with flowering disrupted. The term 'plants' refers to all physical parts of a plant, including seeds, seedlings, saplings, roots, tubers, stems, stalks, foliage and fruits.

The rate at which the pinoxaden is applied as part of the methods of the present invention may depend upon the particular type of weed to be controlled, the degree of control required and the timing of the method of application. In some embodiments, pinoxaden may be applied as part of the present invention at an application rate of between about 5 grams per hectare (g/ha) and about 5000 g/ha. In further embodiments of the invention, the application rate of the pinoxaden may be between about 20 g/ha and about 500 g/ha; between about 30 g/ha and about 400 g/ha; between about 30 g/ha and about 200 g/ha; between about 50 g/ha and about 175 g/ha; and between about 70 g/ha and about 160 g/ha. In additional embodiments of the invention, the application rate of the pinoxaden may be between about 60 g/ha and about 100 g/ha, between about 65 g/ha and 90 g/ha or about 70 g/ha. In one embodiment, the rate of an applied formulation is 9.6 fl oz/1000 sq. ft including 161 g ai/ha of pinoxaden to the warm season turfgrass. In one embodiment, cloquintocet-mexyl is applied in admixture with pinoxaden in a percent by weight ratio of 4:1 (i.e. 4 parts Pinoxaden and one part cloquintocet-mexyl).

The rates utilized of pinoxaden and other, optionally-applied active components may vary based on the type of grass or use of grass to which they are being applied. For example, on a golf course, fairways and greens are typically sprayed with different rates of active ingredients. Accordingly, pinoxaden may be applied in any of the rates expressed above as part of the methods of the present invention.

In some embodiments, in the practice of the methods of the invention, pinoxaden is applied between about 1 and 20 times, or between about 2 and 18 times, or between about 3 and 15 times, or between about 4 and 12 times, or between about 2 and about 8 times, or between about 3 and 4 times to the turfgrass or the locus thereof at intervals of from 7 to 21 days; or from 7 to 14 days, or from 14 to 21 days; or from 7 to 28 days; or from 14 to 28 days; or from 21 to 28 days; or at 7 days, 14 days, 21 days, or 28 days and up to the cumulative maximum labeled rate for pinoxaden for the turfgrass locus being treated.

As indicated above, the methods of the present invention may be utilized against agronomically important weeds. For example, the methods of the present invention may be useful in controlling tropical signalgrass (*Urochloa subquadripara*), Tropical carpetgrass (*Axonopus compressus*), large crabgrass (*Digitaria sanguinalis*), bahiagrass (*Paspalum notatum*), Torpedograss (*Panicum repens*) bull *paspalum* and thin *paspalum* (*Paspalum setaceum*) and/or dallisgrass (*Paspalum dilatatum*).

The methods of the present invention may also be utilized to improve the quality of the turfgrass to which it is applied. As used herein the phrase "quality" of turfgrass is meant to include visual quality of turfgrass and functional quality of turfgrass.

"Visual quality" of turfgrass relates to the visual appearance, such as density (the number of aerial shoots per unit area), uniformity (for example uniformity of texture, e.g. width of the leaf blades, which can be fine-textured as for example in red fescue or coarse-textured as for example in tall fescue), colour or smoothness (which affects for example the playability of a golf course).

"Functional quality" of turfgrass relates to, for example, rigidity (resistance of the turfgrass leaves to compression and is related to the wear resistance of a turf), elasticity (tendency of the turfgrass leaves to spring back once a compressing force is removed), resiliency (capacity of a turf to absorb a shock without altering its surface characteristics), ball roll (average distance a ball travels upon being released to a turf surface), yield (measure of clippings removed with mowing), verdure (measure of amount of aerial shoots remaining after mowing), rooting (amount of root growth evident at any one time during the growing season) and recuperative capacity (capacity of turfgrasses to recover from damage caused by disease organism, insects, traffic and the like).

An improvement in the quality of turfgrass provided by the present methods may relate to one of the mentioned visual or functional quality characteristics or to any combination of these quality characteristics. According to the present invention, an "improvement" is a measurable or noticeable increase in a given turfgrass quality characteristic over the same turfgrass quality characteristic produced under the same conditions, but without the application of the subject method. An improvement in the quality characteristics of turfgrass is, for example, a greener or more pleasant, leaf colour of the turf.

The methods of the present invention may also include the application of compositions that include pinoxaden with the addition of other components, including additional active ingredients. Pinoxaden containing compositions used in the method of the invention can be prepared on site by the end-user shortly before application to the turfgrass, the locus thereof or seeds thereof by mixing in aqueous solution pinoxaden containing composition and a separate active ingredient containing composition, one or more optional additional active ingredient containing composition(s) and, optionally, one or more suitable surfactant(s) or adjuvant(s). Such compositions are typically referred to as "tank-mix" compositions.

Alternatively, the compositions used in the method of the invention may be provided to the end-user already formulated, either at the desired dilution for application ("ready to use" compositions) or requiring dilution, dispersion, or dissolution in water by the end-user ("concentrate" compositions). In some embodiments, the preformulated concentrates may be liquids or particulate solids. In another aspect of the methods of the invention, pinoxaden can be applied to the turfgrass or the locus thereof using turfgrass seed as a carrier.

The compositions used in the methods according to the invention may comprise one or more additional active ingredients, such as a fungicide, insecticide, herbicide or additional growth regulator. An example would be a composition that comprises a fungicide. Any suitable pesticide may be used in the composition, for example to provide control of pests, to overcome problems and delay the onset of resistance, or to provide improved efficacy though an additive or enhanced effect of the active ingredients. Turf wetting agents may also be used in conjunction with the method of the invention. Suitable examples include Revolution® or Radiance® (Aquatrols); and Qualibra™ (Syngenta).

As indicated above, in some embodiments of the present invention, the methods include one or more additional active ingredients being applied including, but not limited to, azoxystrobin; additional plant growth regulators such as trinexapac ethyl, uniconazole, and paclobutrazol; neonicotinoids such as thiamethoxam and imidacloprid; bisamides such as cyantraniliprole and chlorantraniliprole; fluazinam; propiconazole, difenoconazole, cypraconazole; fludioxonil; mefenoxam; cyprodinil; thiophanate methyl; iprodione; triadimefon; propamocarb; fosetyl-al; flurprimidol; flutalonil; pyraclostrobin; boscalid; vinclozolin; trifloxystrobin; myclobutanil; fenarimol; SDHI fungicides such as penthiopyrad, isopyrazam, fluxapyroxad, fluopyram and solatenol; fluoxastrobin; phophonic acid derivatives such as phosphonic acid, monopotassium salt; abamectin; cis-jasmone; abamectin iron chelate mixtures; and lambda cyhalothrin.

In additional embodiments, the methods of the present invention may include applying pinoxaden with one or more of the following herbicides: glyphosate, 2,4-D; 2,4-D choline salt; 2,4-D-2-ethylhexyl ester; bensulfuron-methyl; bispyribac-sodium; cafenstrole; cinosulfuron; clomazone; cyhalofop-butyl; daimuron; dicamba (including the aluminum, aminopropyl, bis-aminopropylmethyl, choline, diglycolamine, dimethylamine, dimethylammonium, potassium and sodium salts thereof); esprocarb; fenoxaprop-P-ethyl; florasulam; halauxifen-methyl; halosulfuron-methyl; iofensulfuron; ipfencarbazone; mefenacet; mesotrione; metsulfuron; molinate; orthosulfamuron; oxadiargyl; oxadiazon; pendimethalin; penoxsulam; pretilachlor; pyrazosulfuronethyl; pyribenzoxim; pyriftalid; quinclorac; tefuryltrione; triafamone; trifloxysulfuron and triasulfuron.

In particular embodiments of the present invention, the methods expressed herein may be used with pinoxaden and another herbicide such as trifloxysulfuron. In additional embodiments, the methods expressed herein may be used with pinoxaden and a safener such as cloquintocet-mexyl. Each of the additional active ingredients may be applied in the rate provided for pinoxaden above or their own rate labeled for use and may be applied in the same number of applications and on the same interval schedule as pinoxaden as discussed above.

Suitable safeners include Isoxadifen-ethyl, benoxacor, cloquintocet-mexyl, fenchlorazole-ethyl, and mefenpyr-diethyl. In particular, there can be mentioned cloquintocet-mexyl as a safener.

The compositions used in the methods of the invention may be employed in any conventional form, for example in the form of a twin pack, a powder for dry seed treatment (DS), an emulsion for seed treatment (ES), a flowable concentrate for seed treatment (FS), a solution for seed treatment (LS), a water dispersible powder for seed treatment (WS), a capsule suspension for seed treatment (CF), a gel for seed treatment (GF), an emulsion concentrate (EC), a suspension concentrate (SC), a suspo-emulsion (SE), a capsule suspension (CS), a water dispersible granule (WG), an emulsifiable granule (EG), an emulsion, water in oil (EO), an emulsion, oil in water (EW), a micro-emulsion (ME), an oil dispersion (OD), an oil miscible flowable (OF), an oil miscible liquid (OL), a soluble concentrate (SL), an ultra-low volume suspension (SU), an ultra-low volume liquid (UL), a technical concentrate (TK), a dispersible concentrate (DC), a wettable powder (WP) or any technically feasible formulation in combination with agriculturally acceptable adjuvants.

Said compositions used according to the methods of invention may be produced in conventional manner, e.g. by mixing the pinoxaden with at least one appropriate formulation adjuvant.

The term "formulation adjuvant" according to the invention denotes a natural or synthetic, organic or inorganic material with pinoxaden is combined in order to facilitate its application to turf. This adjuvant is hence generally inert, and it must be agriculturally acceptable, in particular to turf.

The formulation adjuvant can be a carrier or a surfactant. In compositions according to the invention more than one adjuvant can be present, in such embodiments more than one carrier and/or more than one surfactant can be present, a non-limiting example would be one carrier and two surfactants.

The "carrier" can be a liquid carrier (water, alcohols, ketones, petroleum fractions, aromatic or paraffinic hydrocarbons, chlorinated hydrocarbons, liquefied gases, and the like) or a solid carrier.

Suitable liquid carriers are, but are not restricted to: aromatic hydrocarbons, in particular the fractions $C_8$ to $C_{12}$, such as xylene mixtures or substituted naphthalenes, phthalic esters such as dibutyl or dioctyl phthalate, dipropylene glycol dibenzoate, aliphatic hydrocarbons such as cyclohexane or paraffins, alcohols and glycols as well as their ethers, esters and diesters, such as ethylene glycol monomethyl ether, ketones such as cyclohexanone, strongly polar solvents such as, but not restricted to, N-methyl-2-pyrrolidone, dimethyl sulfoxide or dimethylformamide, and, if appropriate, epoxidized vegetable oils or soybean oil; or water.

Suitable solid carriers are, but are not restricted to: aluminium silicate, urea, sodium sulphate, talc, calcium sulphate or potassium sulphate and seed.

According to the invention a single carrier or a mixture of two or more carriers may be present in the composition(s) used in the methods according to the invention.

"Surfactants" are non-ionic, cationic, amphoteric and/or anionic surfactants having good emulsifying, dispersing and wetting properties. According to the invention a single surfactant or a mixture of two or more surfactants may be present. The surfactants customarily employed in formulation technology are described, inter alia, in the following publications: "McCutcheon's Detergents and Emulsifiers Annual", MC Publishing Corp., Glen Rock, N.J., 1988 and M. and J. Ash, "Encyclopedia of Surfactants", Vol. I-III, Chemical Publishing Co., New York, 1980-1981.

Among the surfactants there may be mentioned, e.g., polyacrylic acid salts, lignosulphonic acid salts, phenolsulphonic or (mono- or di-alkyl)naphthalenesulphonic acid salts, laurylsulfate salts, polycondensates of ethylene oxide with lignosulphonic acid salts, polycondensates of ethylene oxide with fatty alcohols or with fatty acids or with fatty amines, substituted phenols (in particular alkylphenols or arylphenols such as mono- and di-(polyoxyalkylene alkylphenol) phosphates, polyoxyalkylene alkylphenol carboxylates or polyoxyalkylene alkylphenol sulfates), salts of sulphosuccinic acid esters, taurine derivatives (in particular alkyltaurides), polycondensates of ethylene oxide with phosphated tristyrylphenols and polycondensates of ethylene oxide with phosphoric esters of alcohols or phenols.

The compositions used in the methods according to the invention may comprise one or more formulation additives, such as, but not limited to, biocides, anti-freeze, stickers, thickeners and compounds that provide adjuvancy effects including, for example, one or more phthalocyanines or copper phthalocyanines including pigment green such as pigment green 7; phthalocyanine green g; or pigment green 42.

In general, when phthalocyanines or copper phthalocyanines are present in compositions used in the methods according to the invention, the rate of application to the turfgrass or to the locus of the turfgrass is from 0.001 to 10 kilograms of phthalocyanine per hectare (kg/ha), suitably from about 0.01 to about 2 kg/ha, more suitably from about 0.1 to about 1 kg/ha, most suitably from about 0.2 to about 0.8 kg/ha.

Application to Turfgrass:

The methods according to the invention can be practiced by treating the turfgrass and/or the weeds in particular with an effective amount of pinoxaden according to the invention. Within said embodiment of the invention, the pinoxaden is suitably applied to the turfgrass by spraying or spreading. Treatment of turfgrass in accordance with the methods of the invention may be performed by lawn care operators or golf course technicians using known techniques.

Application to the Locus of the Turfgrass:

The compositions used in the method according to the invention can be applied to the turfgrass by treating the locus of the turfgrass with a composition comprising pinoxaden according to the invention.

Application of pinoxaden-containing compositions used in the method of the invention to a locus covers liquid (sprayable) or granular (active ingredient (a.i.) on inert and a.i. on fertilizer) (spreadable) applications as well.

For example, in the practice of method of the invention compositions comprising pinoxaden can be applied to the soil before or after the seeds of the turfgrass are sown or placed into the soil; or such compositions are applied according to the method of invention to a substrate for the growth of turfgrass before or after the seeds of the turfgrass are placed into the substrate; or the compositions applied according to the method of the invention can be applied to the soil before turfgrass grown on a substrate are placed on top of the soil together with the substrate.

In one embodiment, according to the method of the invention compositions comprising pinoxaden are applied to the turfgrass as a sprayable liquid formulation. In another embodiment, such compositions are applied to the turfgrass as a granular formulation. Suitable granules include inert and fertilizer granules. The active ingredient may be dispersed throughout, impregnated into, or coated on the surface of the granules.

BIOLOGICAL EXAMPLES

The following Examples and the results provided illustrate the effectiveness of the present invention Applications of pinoxaden, and pinoxaden plus cloquintocet were applied to various Bermudagrass plots with tropical signalgrass present between August 11 and August 13. The plots were again evaluated 28 days following the application. The following percent weed controls were observed.

TABLE 1

| Treatment | Rate (g active/ha) | % Control (28 Days AIA) |
|---|---|---|
| Pinoxaden | 70 | 79.5 |
| Pinoxaden | 140 | 89.7 |
| Pinoxaden + Cloquintocet-mexyl | 140 + 35 | 90.0 |

TABLE 2

| | Time after initial application (weeks) | | | |
|---|---|---|---|---|
| | 1 | 2 | 4 | 6 |
| Weed Species | % Control | | | |
| Biahiagrass *Paspalum notatum* | 44 | 86 | 98 | 96 |
| LargeCrabgrass *Digitaria sanguinalis* | 39 | 42 | 91 | 84 |
| Tropical Carpetgrass *Axonopus compressus* | 100 | 100 | 95 | 100 |

Applications were Oct. 9, 2017 for Large crabgrass, Oct. 19, 2017 for Biahiagrass, and Nov. 14, 2016 for Tropical Carpetgrass. Pinoxaden was applied at 140 gai/ha Pinoxaden with cloquintocet-mexyl (4:1 ratio by weight, 4 parts Pinoxaden and one part cloquintocet-mexyl), twice on a 3 week interval.

TABLE 3

| | Time after initial application (weeks) | | | |
|---|---|---|---|---|
| | 1 | 2 | 4 | 6 |
| Weed Species | % Control | | | |
| Torpedograss *Panicum repens* | 55 | 63 | 78 | 68 |

Applications initiated on Oct. 1, 2014. Pinoxaden (140 gai/ha) with cloquintocet-mexyl (4:1 ratio by weight) applied twice on a 2 week interval

TABLE 4

| Dallisgrass control with Pinoxaden | | |
|---|---|---|
| Treatment | Rate (g active/ha) | % Control (28 Days AIA) |
| Pinoxaden | 45 | 82 |
| Pinoxaden | 90 | 85 |

Applications of pinoxaden was initiated in AL for dallisgrass control in bermudagrass on Oct. 28, 2013. Two applications were applied. Percent dallisgrass control was taken 28 days after the first application.

Although the invention has been described with reference to preferred embodiments and examples thereof, the scope of the present invention is not limited only to those described embodiments. As will be apparent to persons skilled in the art, modifications and adaptations to the above-described invention can be made without departing from the spirit and scope of the invention, which is defined and circumscribed by the appended claims. All publications cited herein are hereby incorporated by reference in their entirety for all purposes to the same extent as if each individual publication were specifically and individually indicated to be so incorporated by reference.

The invention claimed is:

1. A method for controlling a weed selected from tropical signalgrass, tropical carpetgrass, large crabgrass, bahiagrass, torpedograss, bull *paspalum* and thin *paspalum* and dallisgrass in warm-season turfgrass, comprising applying to the warm-season turfgrass or to the locus of the warm-season turfgrass a composition comprising pinoxaden wherein the pinoxaden is present in an amount effective in controlling the weed, and wherein the weed is selectively controlled over the warm-season turfgrass.

2. The method of claim 1, wherein the warm season turfgrass is selected from the group consisting of bermudagrass, zoysiagrass and St. Augustine.

3. The method of claim 1, wherein the warm-season turfgrass is zoysiagrass.

4. The method of claim 1, wherein the composition further comprises adjuvants, solvents, carrier, surfactants or extenders.

5. The method according to claim 1, wherein the composition comprises from 0.01 to 90% by weight of the pinoxaden, from 10 to 99.99% of a carrier and from 0 to 20% of a surfactant.

6. The method of claim 1, wherein pinoxaden is applied at the rate of from about 30 grams of pinoxaden per hectare to about 200 grams of pinoxaden per hectare.

7. The method of claim 1, wherein pinoxaden is applied at the rate of from about 70 grams of pinoxaden per hectare to about 165 grams of pinoxaden per hectare.

8. The method of claim 1, wherein dallisgrass is controlled.

9. The method of claim 1, wherein tropical signalgrass is controlled.

10. The method of claim 1, wherein tropical carpetgrass is controlled.

11. The method of claim 1, wherein torpedograss is controlled.

12. The method of claim 1, wherein biahiagrass is controlled.

13. The method of claim 7, wherein pinoxaden is applied between about two and 10 times, at intervals of from 14 to 60 days during the turf growing season.

14. The method of claim 7, wherein pinoxaden is applied between about two and 5 times, at intervals of from 28 to 42 days during the turf growing season.

15. The method of claim 7, wherein pinoxaden is applied between about two and 21 times, at intervals of from 7 to 21 days during the turf growing season.

16. The method of claim 7, wherein pinoxaden is applied between about two and 12 times, at intervals of from 10 to 18 days during the turf growing season.

17. The method of claim 1, wherein cloquintocet-mexyl is applied simultaneously or sequentially with pinoxaden to the warm season turf grass.

18. The method according to claim 1, wherein the method further comprises applying an additional herbicide to the warm-season turfgrass or to the locus of the warm-season turfgrass.

19. The method of claim 17, wherein the ratio of cloquintocet-mexyl to pinoxaden is 1:4 by weight.

20. The method of claim 1, wherein applying is done as granular application.

\* \* \* \* \*